United States Patent
Sibley et al.

(10) Patent No.: US 6,394,122 B1
(45) Date of Patent: May 28, 2002

(54) SHOCK ACTUATED SENSOR FOR FLUID VALVE

(75) Inventors: Richard D. Sibley; William F. Keller, both of Lancaster, CA (US)

(73) Assignee: Pacific Seismic Products, Inc., Lancaster, CA (US)

( * ) Notice: Subject to any disclaimer, the term of this patent is extended or adjusted under 35 U.S.C. 154(b) by 0 days.

(21) Appl. No.: 09/668,003

(22) Filed: Sep. 21, 2000

(51) Int. Cl.[7] .............................................. F16K 17/36
(52) U.S. Cl. ...................... 137/15.01; 137/38; 137/39; 251/74; 251/303
(58) Field of Search .................... 137/38, 39, 15.01; 251/66, 74, 298, 303

(56) References Cited

U.S. PATENT DOCUMENTS

| | | | | |
|---|---|---|---|---|
| 4,212,313 A | * | 7/1980 | Winters | 137/39 |
| 4,503,717 A | | 3/1985 | Keller et al. | 74/2 |
| 4,513,629 A | * | 4/1985 | Keller et al. | 74/2 |
| 4,535,796 A | * | 8/1985 | Terrones et al. | 137/45 |
| 4,715,394 A | * | 12/1987 | O'Donnell et al. | 137/38 |
| 4,782,848 A | | 11/1988 | Sibley et al. | 137/38 |
| 4,915,122 A | | 4/1990 | Ikegaya et al. | 137/38 |
| 5,052,429 A | * | 10/1991 | Yoo | 137/38 |
| 5,409,031 A | * | 4/1995 | McGill et al. | 137/38 |
| 5,449,015 A | * | 9/1995 | Petkovic | 137/38 |
| 5,704,385 A | * | 1/1998 | McGill et al. | 137/39 |
| 5,823,223 A | * | 10/1998 | Franklin et al. | 137/38 |

* cited by examiner

*Primary Examiner*—A. Michael Chambers
(74) *Attorney, Agent, or Firm*—Thomas I. Rozsa; Tony D. Chen

(57) ABSTRACT

The improved shock actuated sensor is used with shock activation valves which have a shock activation control mechanism. The control mechanism includes a pedestal with a vertical tube disposed thereround and a weight in the form of a ball supported on the pedestal upper end. When a shock or vibration force is experienced the ball is displaced horizontally from a rest position to a side of the control mechanism where it engages the vertical tube that causes the valve to close. The improvement includes a pedestal upper end with a circumferential step to aid the ball in engaging the vertical tube to activate the valve closing. The step allows gravity, in addition to the shock force, to urge the ball to move the vertical tube. The pedestal upper end may also have a recess in the form of an open cylindrical recess to support the ball.

15 Claims, 2 Drawing Sheets

SHOCK ACTUATED SENSOR FOR FLUID VALVE

BACKGROUND OF THE INVENTION

1. Field of the Invention

This invention relates to valves and valve devices for automatically closing a valve to stop the flow of a fluid in a conduit when the device is subjected to shock and vibration forces such as experienced during an earthquake. The improved shock sensor and actuation device uses gravity to aid in activating a valve closure mechanism.

2. Description of Related Art

Various mechanisms to sense shock and vibration to activate the closing of a valve exist in the art. Such shock actuated valves generally are inserted in a fluid flow line, have a rotating valve element for opening and closing the fluid flow line, and have a mechanism to maintain an open valve position until such time as a shock or vibration of specified characteristics is sensed by a device which then causes the valve to close.

The present invention relates to shutoff valves which use a weight in the form of a ball to sense shock or vibration which force displaces the ball from a normal rest location to actuate a mechanism to cause a valve to close. Reference to U.S. Pat. No. 4,915,122 issued Apr. 10, 1990 shows a shock actuated valve which uses a ball motion to actuate a valve due to earthquake forces and similar shock forces. The improved device modifies the pedestal on which the ball rests to allow gravity force to act on the ball once it has been moved from its position of rest to aid in the actuation of the shock actuation control mechanism. The modification of adding a step to the pedestal upper perimeter surface improves the accuracy for the elapsed time for the valve to be actuated once a specified force has been sensed. In previous art mechanisms the ball motion may be compounded by the ball not initially actuating the shock actuation control mechanism due to for example the ball moving, but rebounding or retreating from an initially urged position to be moved to a second position by the forces. These non-actuating motions of the ball delay valve closure which may increase the possibility of damage as for examples during an earthquake.

SUMMARY OF THE INVENTION

One object of the invention is to improve reliability of the closure of a fluid valve when specified shock and vibration forces are sensed by a sensor mechanism element of the fluid valve. Another object is to improve the repeatability of the actuation of the fluid valve automatic closure.

In accordance with the description presented herein, other objectives of this invention will become apparent when the description and drawings are reviewed.

DESCRIPTION OF THE PREFERRED EMBODIMENT

Figure 1:
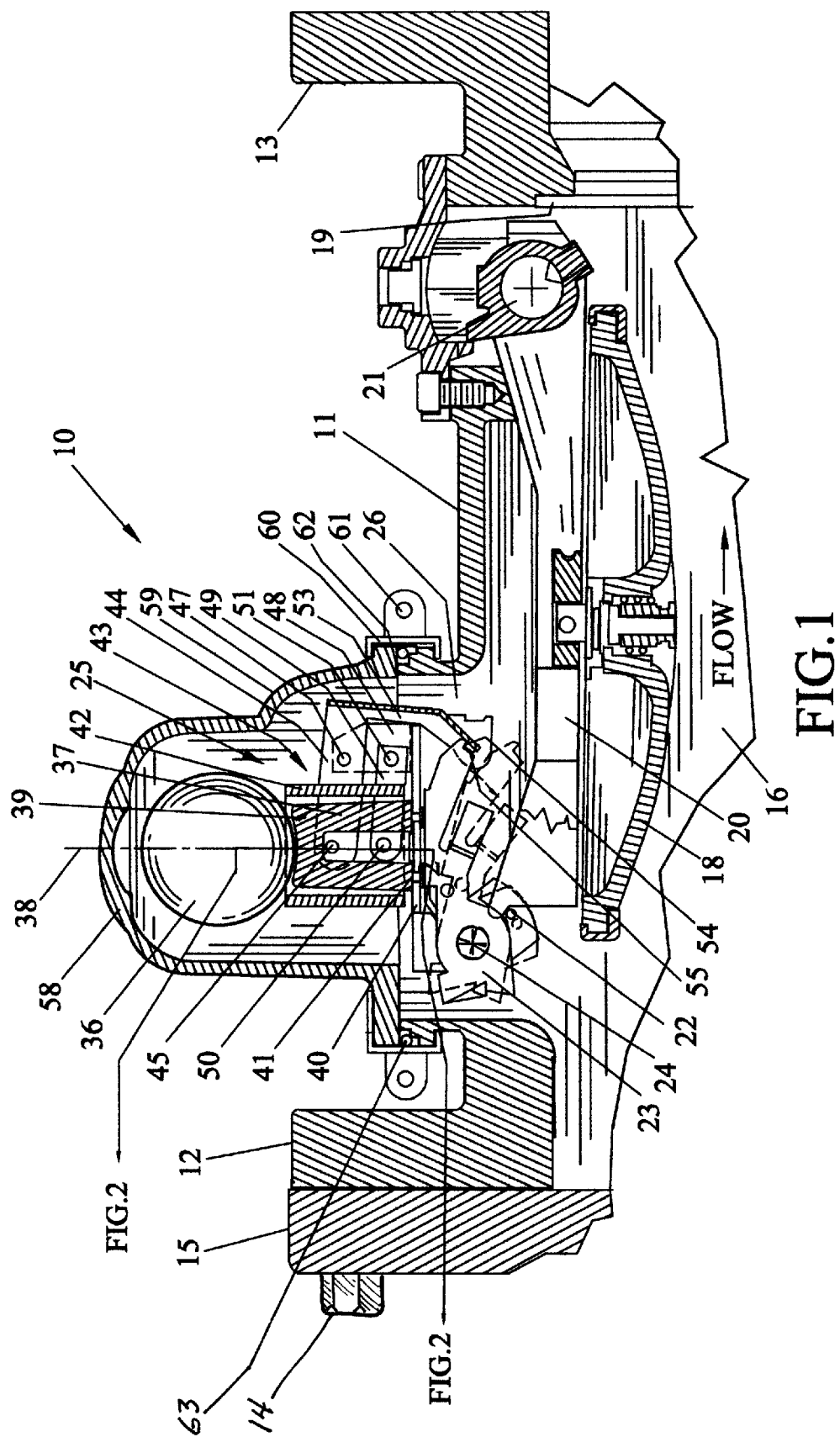
FIG. 1 illustrates a fragmental vertical sectional elevation view of an open shock action valve as disclosed in prior art.

Referring to FIG. 1, an automatic shock actuated valve of the prior art is illustrated. This valve is that disclosed in U.S. Pat. No. 4,915,122 issued Apr. 10, 1990 and which valve description is incorporated herein by reference for disclosure of the preferred embodiment of the instant invention. The prior art reference includes as co-inventors the two inventors of this instant disclosure. While this prior art reference is included to present a preferred embodiment of the improvement mechanism, it is understood the structure and principles can be used with other ball weight actuating valves.

There is illustrated a shock and vibration force responsive valve assembly (10) which is adapted to automatically close off the control of a fluid through a conduit. The assembly includes a tubular main body (11) having flanges (12) and (13) at its opposite ends connectable by fasteners (14) to abutting flanges (15) of adjacent conduit or pipe sections to connect the body into a pipeline. The illustration orientation is such that fluid, for example, natural gas, flows in a left to right direction as viewed in FIG. 1 in an inner passage (16), partially illustrated, in body (11) and parallel to a central horizontal axis of the passage.

The flow control mechanism includes a circular valve element (18) which is engageable with an annular seat (19) formed in body (11) to close off the flow of fluid through the assembly (10). Valve element (18) is carried by arm (20) which swings about a horizontal axis (21) between a closed position and the open position illustrated in FIG. 1. Arm (20) and the carried valve disc (18) are releasably retained in the open position by engagement of arm (20) with latch pin (22) carried by a second arm (23) which is mounted for swinging movement about a horizontal axis (24) between the position illustrated in FIG. 1 and the dashed line position illustrated therein. Arm (23) is in turn releasable retained in position by a shock actuation control mechanism (25). The control mechanism (25) is principally contained in housing (58) having bulge (59). The housing (58) is attached to the tubular main body (11) at annular flanges (62) which have a sealing O-Ring (63). The housing (58) is retained by a circular clamp (60) and fasteners (61).

The control mechanism (25) includes a weight or mass (36) illustrated as a ball. When disc valve (18) is in the open position the ball (36) is supported on a pedestal (37) extending upwardly along vertical axis (38). The pedestal as illustrated is an externally cylindrical form about axis(38) and has an upwardly facing shallow circular recess (39) to retain the ball (36) in its centered, at rest position. The pedestal (37) is attached to the body (11) by plate (40) and fasteners (41).

Figure 2:
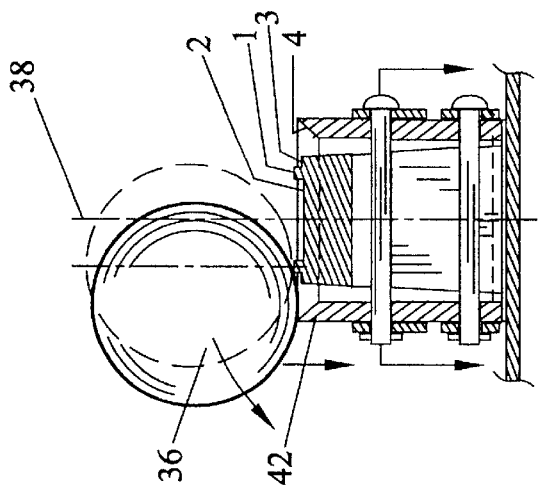
FIG. 2 illustrates a fragmented generally vertical sectional view of the shock actuation control mechanism taken along line 2—2 of FIG. 1 and includes the ball in its rest position on the pedestal as disclosed in prior art.
Figure 4:
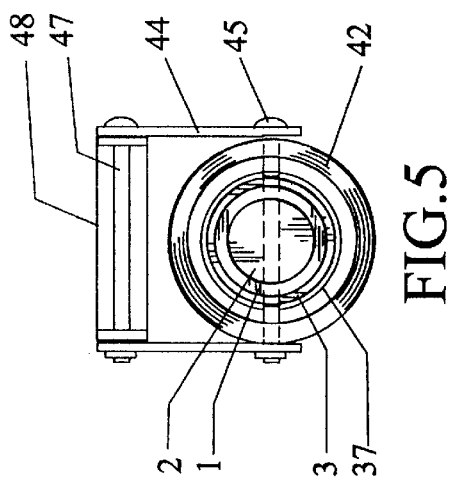
FIG. 4 illustrates a fragmented generally vertical section view of the shock actuation control mechanism with the ball displaced from its state of rest to engage the vertical tube.
Figure 3:
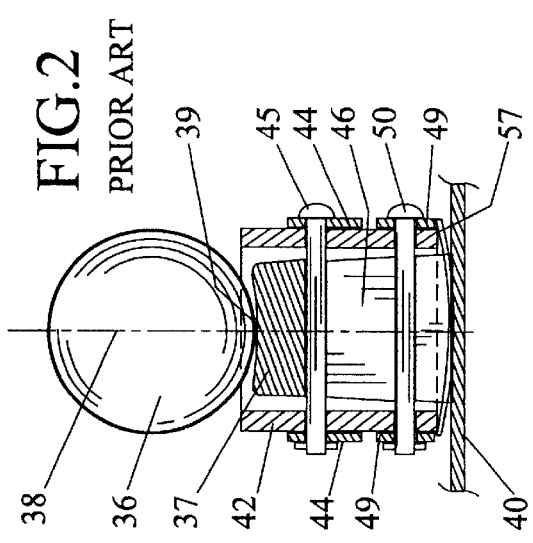
FIG. 3 illustrates a fragmented generally vertical sectional view of the shock actuation control mechanism with improved pedestal.
Figure 5:
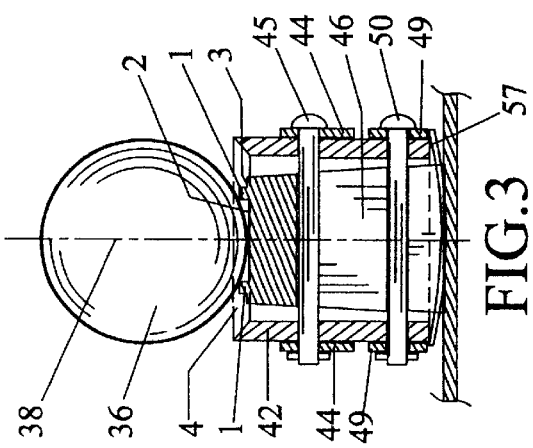
FIG. 5 illustrates a top plan view of the shock actuation control mechanism.

Referring to FIGS. 1 and 2, a vertical tube (42) centered about axis (38) is disposed about and spaced from pedestal (37), and is movable upwardly and downwardly relative to the pedestal (37). The tube (42) is mounted for vertical movement by a parallelogram mechanism (43), including two similar parallel upper links (44) each pivoted at one end to the tube (42) by a horizontal pin (45) extending through vertical slot (46) in pedestal (37), and each pivoted by a second parallel horizontal pin (47) to a pair of vertical bracket arms (48) projecting upwardly from and attached to plate (40). The parallelogram mechanism also includes two similar parallel lower links (49) each pivoted by a first pin (50) to tube (42) and by a second pin (51) to bracket arms (48). A downward movement of the tube (42) causes a rightward swinging movement of cross pin (54) to release arm (20) for closure of the valve (10) by seating valve element (18) by a spring force.

The tube (42) is yieldingly urged upwardly, as for example by a leaf spring or plate spring (57). When ball (36) is moved laterally from its centered position in any horizontal direction relative to pedestal (37) the weight engages the upper edge of tube (42) and displaces the tube (42) downwardly relative to the pedestal to move cross pin (54) carried on projection (53) out of notch (55) in arm (23) and allows downward swinging movement of arm (23) to cause the valve to close. The amount of shock or vibration force to displace ball (36) from recess (39) is determined by the shape and depth of the recess (39) and the mass of the ball (36). In some instances the ball (36) may be displaced by a force which causes ball (36) partial engagement with vertical tube (42), but due to force frequency or other factors the ball (36) does not downwardly displace the vertical tube (42) sufficiently and the ball (36) retreats to a second position. This motion delays the actuation of the valve (10) and thereby the ceasing of flow of the fluid.

Referring to FIGS. 3 through 6, an improved pedestal (37) embodiment is illustrated. The pedestal (37) upper end has been modified to create a ridge (1) or circular protrusion with generally cylindrical recess (2) therein and a step or offset (3) circumferentially formed external to the ridge (1). While a cylindrical recess is discussed in the embodiment other recess shapes, such as that disclosed in the prior art, may be used with the circumferential external offset (3). The ball (36) is supported on pedestal (37) and retained in its central, at rest position by ridge (1).

When a shock or vibration force is experienced by the shock actuation control mechanism (25), the ball (36) is displaced when such force reaches a specified value. If the force is of sufficient strength and duration, the ball (36) is urged upwardly and over the ridge (1). Once the center of gravity of the ball (36) passes the vertical center position of the ridge (1), gravitational force will act on the ball (36) to move it downwardly toward offset (3). This vertical gravitational force combines with the horizontal force displacing the ball (36) to force the vertical tube (42) in a downwardly direction actuating closure of the valve (18).

The offset (3) must be sized to aid the ball (36) engagement with vertical tube (42), but not be so large as to inhibit the return of the ball (36) to its central position when the valve assembly (10) is reset after the shock and vibration forces have ceased. The vertical tube (42) top end may also be beveled (4) for more controlled uniform force application by the ball (36). The diameter of the ridge (1) and the size of the offset (3) are adjusted to cause the valve to close upon sensing the specified motion forces. In this embodiment the value at which the ball (36) will be caused to engage the vertical tube (42) may be adjusted by changing the inside diameter of the ridge (1). It has been found by experiment that for minor adjustment the ball (36) may be impacted by a force, as from example a hammer, causing a spreading impact force to the ridge (1).

Use of the improved pedestal structure has been found by experiment to improve the accuracy of the time for mechanism response to specified shock and vibration forces to be repeatable to within 0.001 of a second.

While the invention has been particularly shown and described with respect to the illustrated and preferred embodiments thereof, it will be understood by those skilled in the art that the foregoing and other changes in form and details may be made therein without departing from the spirit and scope of the invention.

We claim:

1. A method for adjusting a shock actuated valve for response to a shock and frequency force for automatic actuation thereof comprising the steps of:
   a. determining a horizontal force necessary to actuate the valve;
   b. selecting a recess diameter and depth for a pedestal upper end to retain a ball until such force is exceeded;
   c. selecting a protrusion surrounding said recess to enable said ball to roll over said protrusion when said horizontal force is achieved so that the center of gravity of the ball passes over the protrusion such that gravitational force will cause the ball to roll away from said recess;
   d. selecting an offset diameter and depth circumferentially formed external to said protrusion for the pedestal upper end to cause the force of gravity to assist the horizontal force displacing the ball from a rest position which offset also does not inhibit return of the ball to the rest position once the horizontal force has ceased; and
   e. selecting a vertical tube disposed around the pedestal and adjacent the offset wherein movement of the vertical tube actuates a valve, and selecting for the vertical tube a beveled interior facing the pedestal such that the beveled interior results in a more controlled uniform force as the ball comes in contact with the beveled interior of the vertical tube.

2. A method for adjusting a shock actuated valve for response to a shock and frequency force for automatic actuation thereof comprising the steps of:
   a. determining a horizontal force necessary to actuate the valve;
   b. selecting a recess and depth for a pedestal upper end to retain a weight until such force is exceeded;
   c. selecting a protrusion at least partially surrounding said recess to enable said weight to cross over said protrusion when said horizontal force is achieved so that the center of gravity of the ball passes over the protrusion such that gravitational will cause the ball to roll away from said recess; and
   d. selecting an offset diameter and depth circumferentially formed external to said protrusion for the pedestal upper end to cause the force of gravity to assist the horizontal force displacing the ball from a rest position which offset also does not inhibit return of the ball to the rest position once the horizontal force has ceased.

3. A method for adjusting a shock actuated valve for response to a shock and frequency force for automatic actuation thereof comprising the steps of:
   a. determining a horizontal force necessary to actuate the valve;
   b. selecting a recess and depth for a pedestal upper end to retain a weight until such force is exceeded;
   c. selecting a protrusion at least partially surrounding said recess to enable said weight to cross over said protrusion when said horizontal force is achieved so that the center of gravity of the ball passes over the protrusion such that gravitational force will cause the ball to roll away from said recess; and
   d. selecting a vertical tube disposed around the pedestal wherein movement of the vertical tube actuates a valve, and selecting for the vertical tube a beveled interior facing the pedestal such that the beveled interior results in a more controlled uniform force as the weight comes in contact with the beveled interior of the vertical tube.

4. A method for adjusting a shock actuated valve for response to a shock and frequency force for automatic actuation thereof comprising the steps of:
   a. determining a horizontal force necessary to actuate the valve;
   b. selecting a recess and depth for a pedestal upper end to retain a weight until such force is exceeded; and
   c. selecting a protrusion at least partially surrounding said recess to enable said weight to cross over said protrusion when said horizontal force is achieved so that the center of gravity of the ball passes over the protrusion such that gravitational force will cause the ball to roll away from said recess and toward a valve actuation means.

5. A shock actuated valve having a shock actuated control mechanism comprising:
   a. a pedestal at an upper end of which a circular recess is formed therein in which a weight in the form of a ball is supported and retained central to the pedestal vertical axis;
   b. a vertical tube disposed around said pedestal, the vertical tube having a beveled interior facing said pedestal;
   c. said pedestal having a circular protrusion surrounding said circular recess; and
   d. said pedestal further having a step offset circumferentially formed external to said circular protrusion so that the step offset is formed around the upper circumference of said pedestal;
   e. whereby when a shock or vibration force is experienced by said shock actuated control mechanism, said weight is displaced when such force reaches a specified value causing said weight to roll over said circular protrusion so that the center of gravity of said weight passes the vertical center position of said circular protrusion such that gravitational force will act on said weight to move it downwardly toward said step offset so that said weight contacts said vertical tube where said beveled interior results in a more controlled uniform force as said weight causes said vertical tube to move to thereby actuate and close the valve to stop the flow of a fluid therethrough.

6. A shock actuated valve having a shock actuated control mechanism comprising:
   a. a pedestal at an upper end of which a recess is formed therein in which a weight is supported and retained to the pedestal vertical axis;
   b. a vertical tube disposed around the pedestal, the vertical tube having a beveled interior facing the pedestal;
   c. said pedestal having a protrusion surrounding at least a portion of said recess; and
   d. said pedestal further having a step offset circumferentially formed external to the protrusion so that the step offset is formed around at least a portion of the upper circumference of the pedestal;
   e. whereby when a shock or vibration force is experienced by the shock actuated control mechanism, the weight is displaced when such force reaches a specified value causing the weight to cross over the protrusion so that the center of gravity of the weight passes the vertical center position of the protrusion such that gravitational force will act on the weight to move it downwardly toward the step offset so that the weight contacts the vertical tube where the beveled interior results in a more controlled uniform force as the weight causes the vertical tube to move to thereby actuate and close the valve to stop the flow of a fluid therethrough.

7. The shock actuated valve as defined in the claim 6 wherein said weight is a ball.

8. A shock actuated valve having a shock actuated control mechanism comprising:
   a. a pedestal at an upper end of which a recess is formed therein in which a weight is supported and retained central to the pedestal vertical axis;
   b. a vertical tube disposed around the pedestal;
   c. said pedestal having a protrusion surrounding at least a portion of said recess; and
   d. said pedestal further having a step offset circumferentially formed external to the circular protrusion so that the step offset is formed around at least a portion of the upper circumference of the pedestal;
   e. whereby when a shock or vibration force is experienced by the shock actuated control mechanism, the weight is displaced when such force reaches a specified value causing the weight to cross over the protrusion so that the center of gravity of the weight passes the vertical center position of the circular protrusion such that gravitational force will act on the weight to move it downwardly toward the vertical tube so that as the weight contacts the vertical tube the weight causes the vertical tube to move to thereby actuate and close the valve to stop the flow of a fluid therethrough.

9. The shock actuated valve as defined in claim 8 wherein said weight is a ball.

10. A shock actuated valve having a shock actuated control mechanism comprising:
    a. a pedestal at an upper end of which a recess is formed therein in which a weight is supported and retained to the pedestal vertical axis;
    b. a vertical tube disposed around the pedestal, the vertical tube having a beveled interior facing the pedestal; and
    c. said pedestal having a protrusion surrounding at least a portion of said recess;
    d. whereby when a shock or vibration force is experienced by the shock actuated control mechanism, the weight is displaced when such force reaches a specified value causing the weight to cross over the protrusion so that the center of gravity of the weight passes the vertical center position of the protrusion such that gravitational force will act on the weight to move it such that the weight contacts the vertical tube where the beveled interior results in a more controlled uniform force as the weight causes the vertical tube to move to thereby actuate and close the valve to stop the flow of a fluid therethrough.

11. The shock actuated valve as defined in claim 10 further comprising a step offset on said pedestal circumferentially formed external to the protrusion so that the step offset is formed around at least a portion of the upper circumference of the pedestal.

12. The shock actuated valve as defined in the claim 10 wherein said weight is a ball.

13. A shock actuated valve having a shock actuated control mechanism comprising:
    a. a pedestal at an upper end of which a recess is formed therein in which a weight is supported and retained to the pedestal vertical axis;

b. a vertical tube disposed around the pedestal; and c. said pedestal having a protrusion surrounding at least a portion of said recess;

d. whereby when a shock or vibration force is experienced by the shock actuated control mechanism, the weight is displaced when such force reaches a specified value causing the weight to cross over the protrusion so that the center of gravity of the weight passes the vertical center position of the protrusion such that gravitational force will act on the weight to move it such that as the weight contacts the vertical tube the weight causes the vertical tube to move to thereby actuate and close the valve to stop the flow of a fluid therethrough.

14. The shock actuated valve as defined in the claim 13 wherein said weight is a ball.

15. A shock actuated valve having a shock actuated control mechanism comprising:

a. a pedestal at an upper end of which a recess is formed therein in which a weight is supported and retained to the pedestal vertical axis;

b. a vertical tube disposed around the pedestal, the vertical tube having a beveled interior facing the pedestal; and c. said pedestal having a protrusion surrounding at least a portion of said recess;

d. whereby when a shock or vibration force is experienced by the shock actuated control mechanism, the weight is displaced when such force reaches a specified value causing the weight to cross over the protrusion so that the center of gravity of the weight passes the vertical center position of the protrusion such that gravitational force will act on the weight to move it such that the weight contacts the vertical tube where the beveled interior results in a more controlled uniform force as the weight causes the vertical tube to move to thereby actuate and close the valve to stop the flow of a fluid therethrough.

* * * * *